Figure 6:
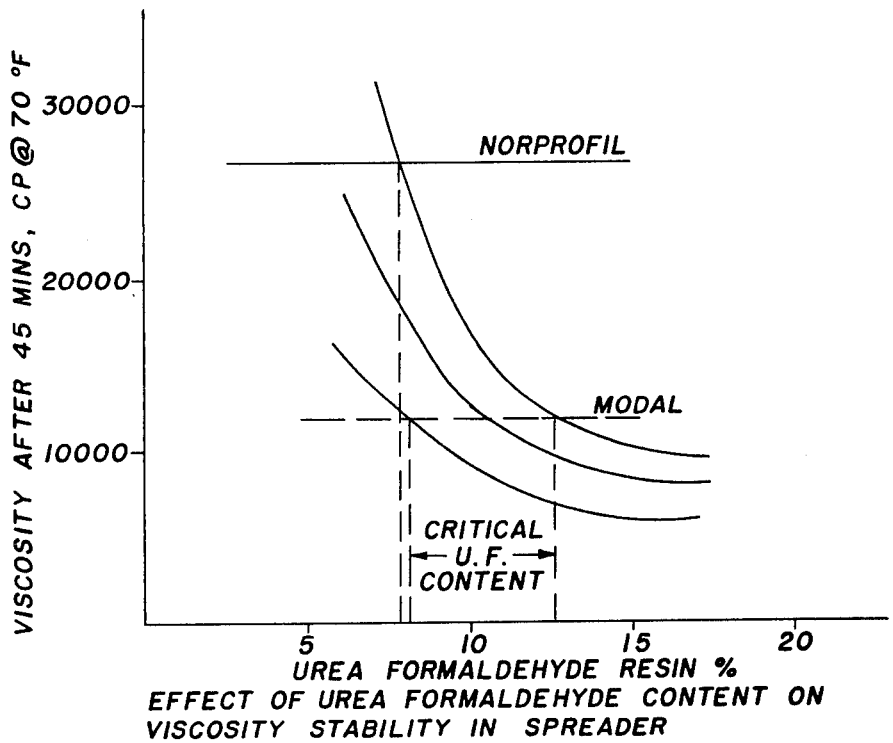

United States Patent [19]
Stout et al.

[11] 3,965,056
[45] June 22, 1976

[54] ADHESIVE EXTENDED COMPOSITION

[75] Inventors: Ronald M. T. Stout, Surrey; Douglas E. Rogerson, Richmond, both of Canada

[73] Assignee: MacMillan Bloedel Limited, Vancouver, Canada

[22] Filed: Aug. 25, 1975

[21] Appl. No.: 607,593

Related U.S. Application Data

[63] Continuation of Ser. No. 400,391, Sept. 24, 1973, abandoned.

[52] U.S. Cl. ............................ 260/17.2; 106/288 Q; 106/308 M; 260/17.3
[51] Int. Cl.² .......................................... C08L 1/02
[58] Field of Search .................... 260/17.2, 17.3; 106/288 Q, 308 M

[56] References Cited
UNITED STATES PATENTS

| | | | |
|---|---|---|---|
| 2,283,740 | 5/1942 | Klemm | 260/840 |
| 2,364,721 | 12/1944 | Kassay | 260/9 |
| 2,405,658 | 8/1946 | Kremer | 260/7 |
| 2,594,280 | 4/1952 | Beaudet | 260/17.2 |
| 3,429,770 | 2/1969 | Ayers | 260/17.2 |
| 3,539,478 | 11/1970 | McDow et al. | 260/17.2 |
| 3,696,064 | 10/1972 | Re | 260/17.2 |

*Primary Examiner*—Donald E. Czaja
*Assistant Examiner*—Edward Woodberry
*Attorney, Agent, or Firm*—Larson, Taylor and Hinds

[57] ABSTRACT

An extender for synthetic resin glues made up of wood particles comminuted to the point where substantially no whole structure is left, and preferably most of the wood particles having hardened resin thereon to aid in the comminution thereof.

2 Claims, 8 Drawing Figures

EFFECT OF PARTICLE SIZE GRIND ON VISCOSITY IN SPREADER

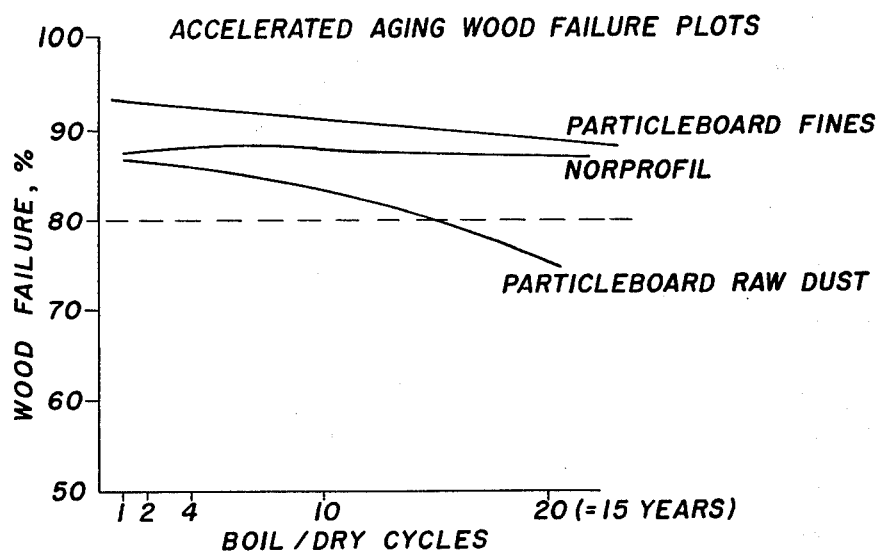
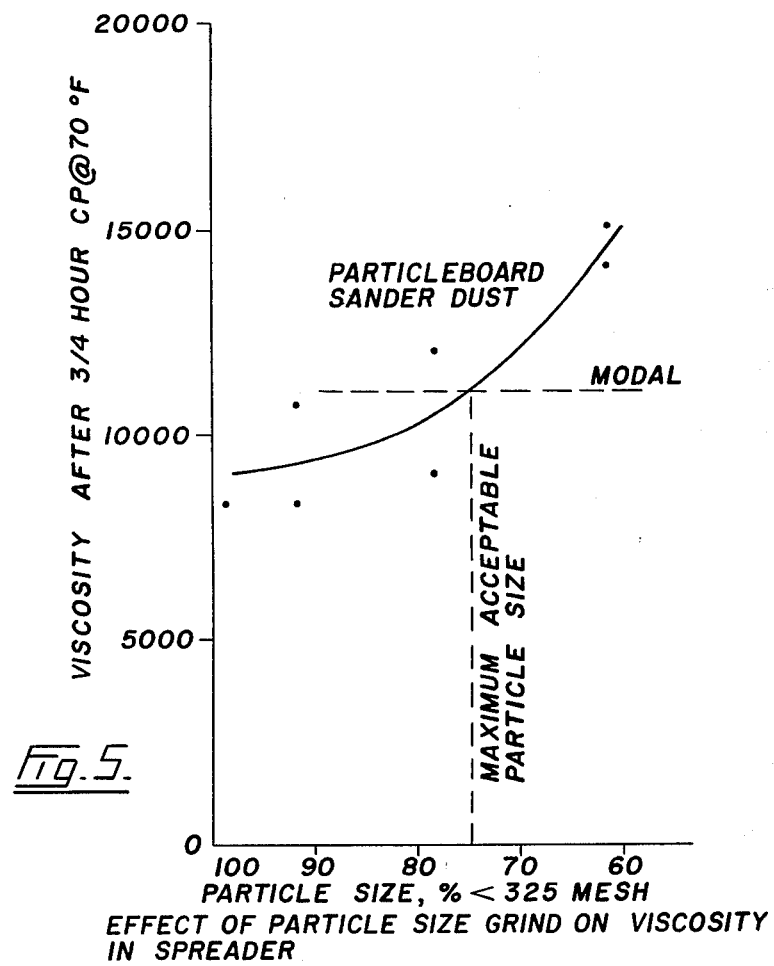

ACCELERATED AGING COMPARISON OF PARTICLEBOARD AND
MODAL GLUE PLYWOOD BOND QUALITY FROM 36 HOUR TRIAL
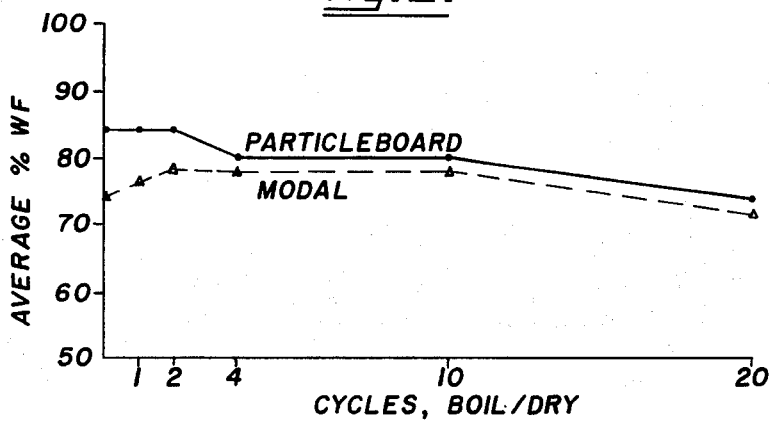
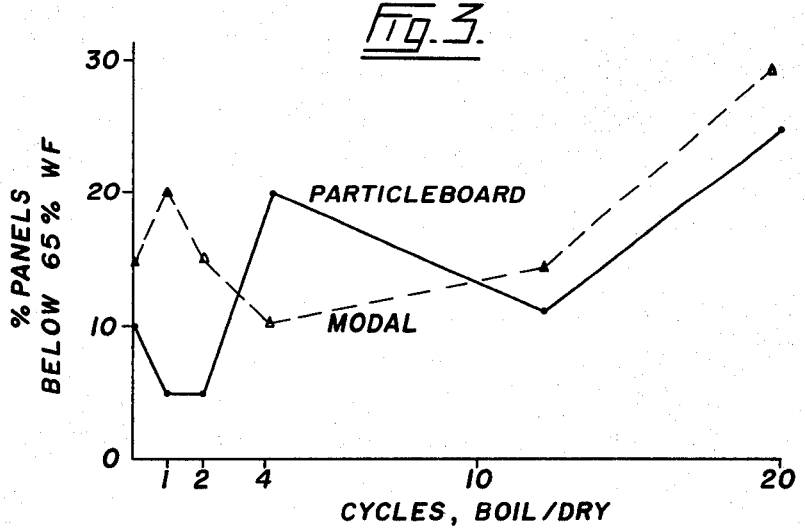
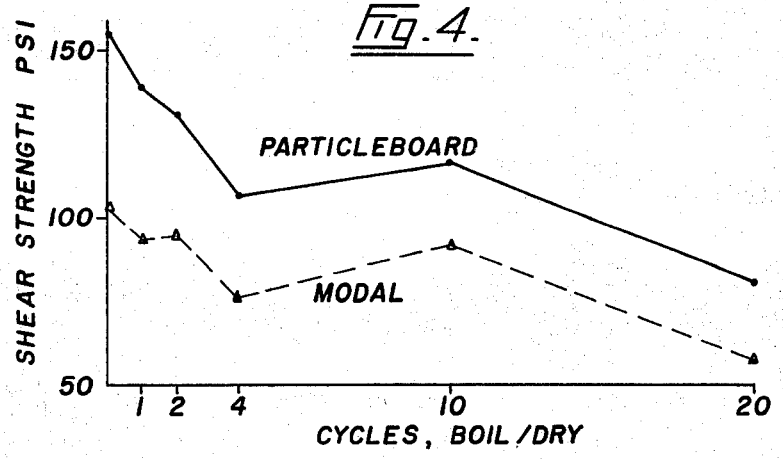

EFFECT OF UREA FORMALDEHYDE CONTENT ON VISCOSITY STABILITY IN SPREADER

EFFECT OF WOOD SPECIES ON VISCOSITY STABILITY IN GLUE SPREADERS

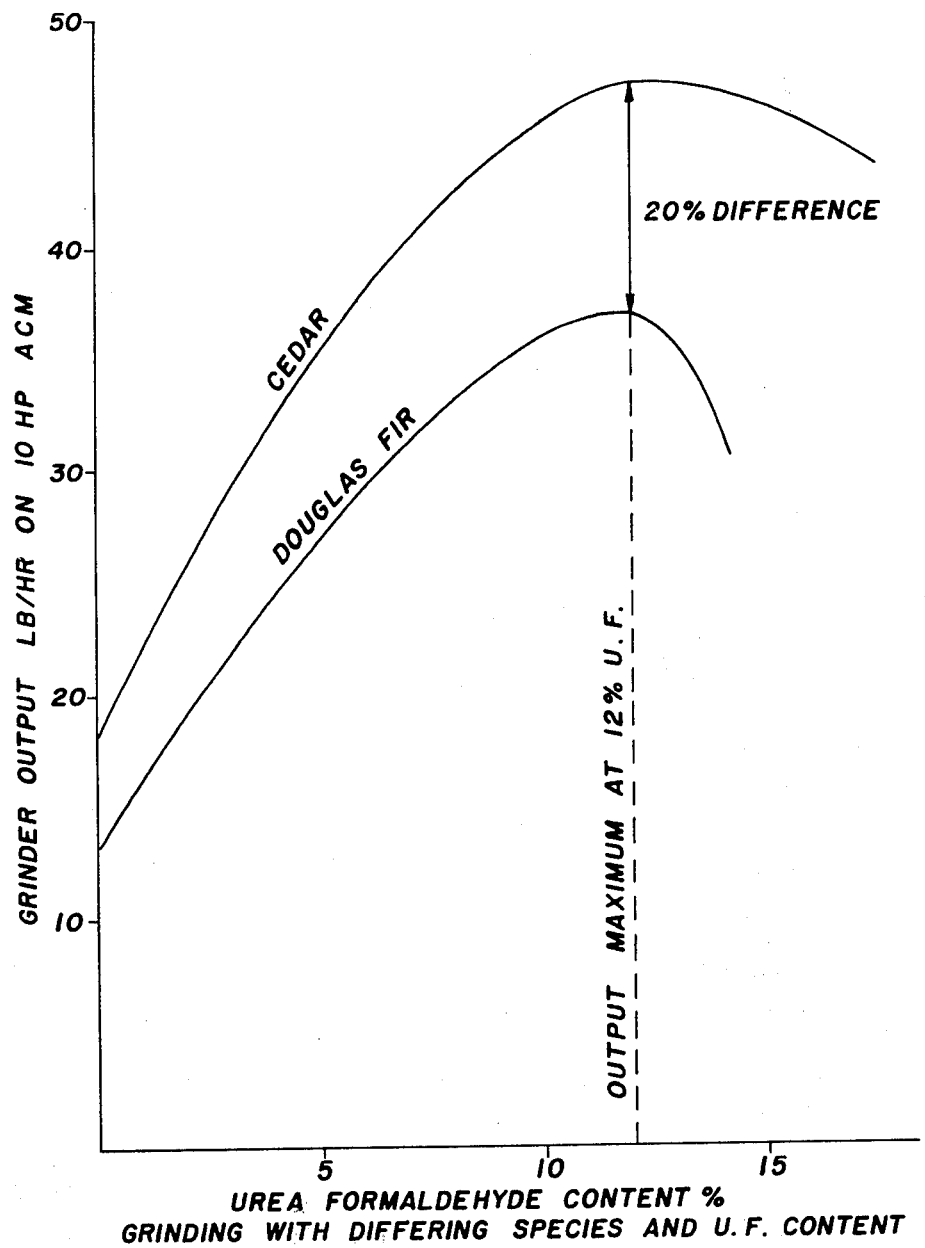

ADHESIVE EXTENDED COMPOSITION

This is a continuation, of application Ser. No. 400,391 filed Sept. 24, 1973 and now abandoned.

This invention relates to extenders for glues or adhesives, and particularly for those used in the manufacture of wood products such as plywood which is usually glued with aqueous alkaline phenolic formaldehyde resin adhesives.

The use of organic fillers or extenders with liquid synthetic resin glues is common practice. These fillers are added both to reduce cost and to improve performance of the adhesive. For example, the fillers serve to give added body to the adhesive thereby providing better gap filling qualities. Fillers also help to control glue viscosity and to retain moisture in the glue line. Commonly used fillers include, for example, wood flour, wheat flour, ground bark or walnut shell flour, and partially hydrolyzed lignocellulosic materials such as the residues from the manufacture of furfural.

Not all of these fillers however will work satisfactorily when used with aqueous alkaline phenol formaldehyde resins such as those commonly used in the manufacture of exterior grades of plywood. In particular, wood flour (e.g. plywood sanderdust) and other unmodified lignocellulosic materials swell and absorb water under the influence of the strongly alkaline phenol formaldehyde resins so that the adhesives produced therefrom thicken progressively with time. This makes it difficult or impossible to control the viscosity of such adhesives and hence to control the spread levels when such adhesives are applied to veneer with roll spreaders or similar commonly used devices.

Fillers that can be successfully used together with aqueous alkaline phenol formaldehyde resins are those containing relatively low levels of cellulose (for example, alder bark or walnut shell flour) or in which the cellulose has been extensively modified by chemical action (e.g. the residues left from the manufacture of furfural by the acid hydrolysis of corn cobs).

The extenders in general use today do a reasonably good job, but they do not include all the characteristics necessary for an ideal extender. The ideal plywood glue extender should 1. Be compatible with the glue being extended, that is, it must be neutral or inert in the glue.
2. Leave the glue in satisfactory condition for its job.
3. Not separate out of the glue during storage.
4. Not shorten the pot life of the glue.
5. Must develop adequate but not excessive viscosity in the adhesive during mixing, storage and glue application (in the presence of strong aqueous alkaline glue).
6. Be cheap, that is, from an inexpensive source and easy to produce.
7. Be easy to store.
8. Be readily available in large quantities.

The glue extender of the present invention has these characteristics.

An extender according to the present invention comprises wood particles comminuted to the point where a large percentage of the particles have substantially no whole cell structure left capable of absorbing water and causing swelling. In order to accomplish this it has been found necessary to treat the wood particles so that they become stiff or brittle enough to be ground to the desired degree. Any material that will penetrate and coat the wood of the particles so as to be become one therewith, and is compatible with the glue to be extended, can be used for this purpose. It has been found that cured thermosetting resins are suitable. Wood flour or ordinary sander dust has such a large percentage of whole cells that they are not suitable for extending resins of the type discussed herein.

More particularly extender according to this invention comprises wood particles which have been modified with cured thermosetting resins such as urea formaldehyde and then been comminuted to a particle size which does not cause excessive thickening of adhesives made with strongly alkaline aqueous phenol formaldehyde resins such as used in the manufacture of exterior plywood.

It has now been found, surprisingly, that the sanderdust which is obtained as a waste product during the manufacture of particleboard, when processed to meet various size and resin content limitations, meets the requirements of this invention and can be used satisfactorily as an extender in adhesives made with the aqueous alkaline phenol formaldehyde resins.

As is well known, particleboards are made of wood particles having glue applied thereto, after which said particles are spread or laid into mats, and then subject to heat and pressure to produce overthick boards. These are sanded down on their major surfaces to the desired thickness. The sandedust is collected in cyclones and filter systems. Some of the coarser particles may be returned to the "furnish" for the formation of boards, and some may be burned.

The invention also contemplates the method of producing extenders which comprises comminuting wood modified with cured urea formaldehyde resin to a particle size which does not develop excessive viscosity in strongly alkaline aqueous adhesives.

Small wood particles can be used as a glue extender if they have a compatible cured synthetic resin adhering thereto. The adhering resin must be inert in the glue being extended, and it helps to prevent the excessive swelling associated with woody material in strongly alkaline aqueous adhesives and the consequent excessive thickening of the resulting glue. However, another benefit of the resin content is to enable the wood particles to be easily ground down to the desired size. Without the adhering resins, the wood particles are not hard enough or brittle enough to be ground down easily to the point where there is substantially no cellular structure left.

The glue extender can be intentionally manufactured from particles of wood. In this case, resin will be applied to the partially comminuted particles and after it is cured the particles are ground down to a particle size of something of the order of 325 mesh screen aperture dimension. However, one of the great advantages of this invention is the fact that particleboard sander dust can be used for this purpose. This dust is readily available in large quantities, at low raw material value for conversion into a relatively high value product. A small percentage of the sander dust as it is produced is small enough to be used as an extender if it has been separated from the coarser particles in a cyclone separator collection system. However, the bulk of the sander dust has to be ground down to the desired size.

The present invention contemplates the extender by itself, glue extended by this extender, the method of producing the extender, and the method of extending plywood glue through the use of this extender.

It has been found that the wood particles which have been modified with the cured resin must be broken down to the point where little or no cellular structure remains either in the longitudinal or cross section direction of the wood fibres. This breakdown of cellular structure has been found to be required both to prevent excessive viscosity development in plywood mixed glue during glue application on a roll spreader and to give a stable suspension of the extender in the glue mix for storage.

As stated above, it has been found that particleboard sander dust is extremely suitable for this purpose. The sander dust is preferably ground down to a particle size specification of about 90 to 95% through a 325 mesh screen. This is the ideal size, but this can be relaxed so that about 75% will pass through this screen. The largest particles that can be tolerated in a suitable glue mix are about 150 microns as determined by a Coulter counter apparatus. Up to 0.5% of these particles can be tolerated when the remainder of the mixture falls within the desired range. It has also been found that the resin content of the particles can be from 6 to 18% or more by weight of the particles.

A large percentage of the resin in the conventional three layer particleboards is concentrated in the fine particle surface layers. The resin content of the sander dust from these particleboards is in the range of 14 to 18% compared to the overall average board resin content of 6%. Particleboard sander dust with this resin content and ground within the specified particle size range provides an extremely satisfactory glue extender which will operate very well in roll spreaders. If the resin content of the extender is materially decreased below 6% the mixed glue tends to show excessive viscosity development in the glue spreader and is not very satisfactory for this particular application method.

The use of synthetic resins other than urea formaldehyde in particleboard, such as phenol formaldehyde, is of no consequence of the usefulness of the particleboard sander dust as a plywood glue extender, provided the resin solids are present in sufficient quantity, are fully cured and the particles are reduced to the required size.

It has been found that the modification of the wood xylem tissue of Western softwood species with particleboard synthetic urea formaldehyde resin by curing the mixture as a compressed panel in a hot press and comminuting the board or a part thereof can produce a satisfactory glue extender material. However, in practice, the new glue extender should be made from an existing three-layer particleboard product by collection of sander dust from the existing sanding process, grinding the raw sander dust material to a particle size specification of 80 to 95% through a 325% mesh screen. Glue extender can be made by direct classification of the raw sander dust in the manufacturing plant sander dust system cyclones and separate collection of the finest fraction. This fine fraction can be used alone, or it can be mixed with the ground sander dust.

The behaviour of the particleboard sander dust as a satisfactory plywood glue extender has been found to depend on the particle size and the synthetic resin content of the sanded particleboard.

Too coarse a particle size causes unacceptable viscosity increase of the resulting plywood glue during the residence time of the glue in the conventional roll spreaders. The particle size specification of 90 to 95% through a 325 mesh screen has been found to be most satisfactory for this use although the particle size specification may be relaxed to about 75% before excessive glue viscosity becomes a problem. With glue application systems other than the roll spreaders, where less mixing energy is dissipated, further relaxation of the particle size may be acceptable.

Figure 7:
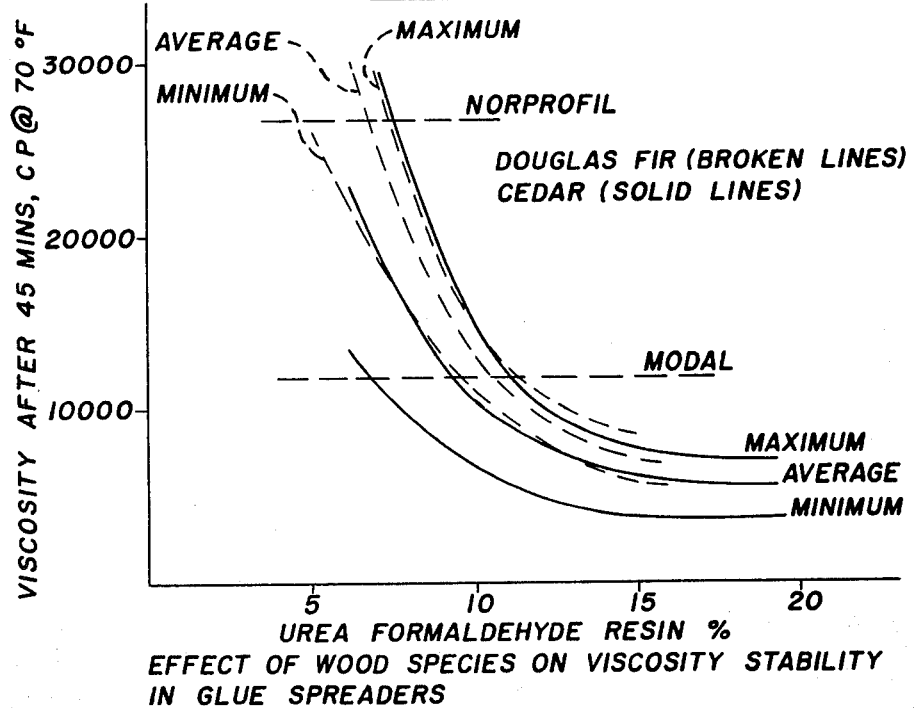

The accompanying drawings are graphs depicting the various points brought out in the following Examples, and in these drawings, FIG. 1 is a comparison of the accelerated aging bond quality of plywood made with glues having two different sander dust particle sizes and an extender of the prior art, FIGS. 2, 3 and 4 illustrate effect of accelerated aging on panels having glue extended by present extender and a known type of extender, FIG. 5 shows effect of particle size in present particleboard sander dust extender on viscosity of a constant amount of glue in a roll spreader over a period of time, FIG. 6 illustrates effect on glue viscosities on roll spreader when sander dusts having different resin contents are used as extenders, FIG. 7 is a comparison of the effect of the different extended glues of FIG. 6 when the extenders are made from two different wood species, and FIG. 8 illustrates the effect of two different wood species on the output of a grinder when grinding sander dust particles for the extenders.

The following examples illustrate the usefulness of the present extender.

EXAMPLE I

A fine particle size fraction (99% through a 325 mesh) of sander dust from the sanding of particleboard (18% glue in the face layers and 6% in the core layer) was collected from the particleboard plant cyclone system and tested as a partial replacement for standard ground alder bark extender with one full scale mill glue mix and used in a roll spreader for up to 10 hours. The glue mix viscosity was 2400 cP at 70°F. and 6 rpm on the No. 3 spindle of a Brookfield viscometer (57° MacMichael). The viscosity stability of the glue on the roll spreader was satisfactory with an equilibrium value of 3400 cP (105° MacMichael) in the bottom trough. The bond quality of panels made during this trial were satisfactory (above 80% wood failure on average) as shown in the following Table I.

TABLE I

BOND QUALITY FROM 10 HOUR SPREADER TRIAL OF PARTICLEBOARD CYCLONE FINES AND ALDER BARK EXTENDED GLUES

| Panel Construction | No. of Samples | Average % WF* ± SE** | % Panels 65% WF |
|---|---|---|---|
| 3/8" | 4 | 91.3 ± 1.89 | 0 |
| 9/16" | 3 | 87.3 ± 8.97 | 0 |
| Overall | 7 | 89.6 ± 3.62 | 0 |

*Wood failure
**Standard error of the average

EXAMPLE II

Particleboard sander dust was ground on a 75 HP air classifying impact grinding mill to a particle size of 90 to 95% through a 325 mesh screen specification. The properties of the ground product are given in the following Table II:

TABLE II

COMPARATIVE PROPERTIES OF GROUND PARTICLEBOARD SANDER DUST, MODAL*, AND NORPROFIL* EXTENDERS

|  | Particleboard Sander Dust Extender | Norprofil (corncob residue) | Modal (alder bark) |
|---|---|---|---|
| Density, lb/cu ft: |  |  |  |
| Uncompacted | 13.2 | 26.5 | 19.5 |
| Compacted by vibration | 20.7 | 39 | 28.7 |
| Moisture Content, % | 3 – 5 | 8 – 13 | 5 – 10 |
| Particle Size, % through 325 mesh | 91 | 75 | 75 |
| % Urea Formaldehyde Resin | 18 | — | — |
| Colour | light tan | black | dark tan |

*Trade Marks

Enough of the ground particleboard sander dust glue extender was produced to supply a large plywood manufacturing operation for one complete week. The material was used as a glue extender during this time with satisfactory mixing, storage, spreading and bond quality. The results were compared with the two weeks following on the same operation during which the standard extenders, sold under the trade marks Modal and Norprofil were used. The comparison of results is shown in the following Tables III to VI. The viscosity developed at the mixer was within the range for the standard extenders (Table III), and the viscosity at the roll spreaders was also within the range of standard extenders (Table V). The gelation time of the mixed glue was similar to that with the standard extenders (Table IV).

TABLE III

VISCOSITY OF GLUE MIXES MADE DURING ONE WEEK MILL TRIALS

| Statistic | Extender Modal | Particleboard Sander Dust Extender | Norprofil |
|---|---|---|---|
| Mean Viscosity (° MacMichael at 70°F) | 37 | 47 | 89 |
| Standard Deviation of Samples | 6.2 | 7.1 | 21.4 |
| Number of Mixes (Total) | 58 | 54 | 50 |

TABLE IV

GELATION TIMES OF MIXED GLUE DURING ONE WEEK TRIALS

| Statistic | Extender Modal | Particleboard Sander Dust Extender | Norprofil |
|---|---|---|---|
| Average Gelation Time, minutes | 25.5 | 25.7 | 25.5 |
| Standard Error of Mean | ±.29 | ±.78 | ±.22 |
| Number of Samples | 5 | 5 | 5 |

TABLE V

VISCOSITY AT THE GLUE SPREADERS DURING ONE WEEK MILL TRIAL

| Statistic | Extender Modal | Particleboard Sander Dust Extender | Norprofil |
|---|---|---|---|
| Mean Viscosity (° MacMichael at 70°F) | 101 | 134 | 160 |
| Standard Error of Mean | 4.4 | 5.1 | 7.7 |
| Number of observations | 46 | 66 | 33 |

TABLE VI

BOND QUALITY FROM FULL SCALE ONE WEEK TRIAL

| Extender: | Modal | Particleboard Sander Dust | Norprofil |
|---|---|---|---|
| Average % Wood Failure | 87 | 84 | 85 |
| % Panels 65% WF | 1.5 | 4 | 3.5 |

EXAMPLE IV

Accelerated Aging Bond Quality of Particleboard Sander Dust Extender

Laboratory plywood test panels which had been made up with glue having extenders of two different particle size fractions of particleboard sander dust (15% <325 mesh and 99% <325 mesh sizes), and also the standard Norprofil were tested for accelerated aging bond quality in the boil/dry cyclic test of Northcott and Colbeck, see Forest Products Journal 10(8): 403 (1960). The results given in FIG. 1 show that the long term bond quality of the finer fractions (99% <325 mesh) of the sander dust is better than that of the standard extenders. The coarse fraction (15% <325 mesh) gave poorer long term bond quality. This indicates that bond quality of particleboard extender decreases with increasing particle size.

Panels made up under mill conditions with glue extended by ground particleboard sander dust were also tested with this accelerated aging method. The bond quality behaviour was found to be satisfactory, compared to the Modal-extended glue control panels, as shown in FIGS. 2, 3 and 4.

EXAMPLE V

Effect of Particle Size on Roll Spreader Usability

Samples of particleboard sander dust extender (18% urea formaldehyde) were ground to different particle size specifications (60, 78, 92 and 99% through 325 mesh), and made into standard glue mixes. These mixes were tested for glue viscosity increase over 45 minutes runs on a roll spreader with rubber rolls 24 inches long, 10 inch diameter going at a circumferential speed of 200 linear feet per minute. FIG. 5 shows a plot of the results, along with the standard Modal extender result. This indicates that the maximum particle size specification for use of particleboard sander dust in a glue spreader is in the range of 75 to 80% through a 325 mesh.

EXAMPLE VI

Three different grinds of particleboard sander dust extender made into mixed glue were tested for extender/resin separation characteristics. The following results were obtained:

| Particle Size Specification <325 mesh | Separation of extender and resin after 1 week |
|---|---|
| 60% | Definite separation of resin and extender |
| 78% | Slight resinous layer separate from glue |
| 90% | No separation |

The 78% particle size was the size where extender/resin separation began to show up. Thus the lower limit on particle size specification was about 80% <325 mesh based on extender/glue separation criteria.

The stability of the particleboard sander dust extender during storage of the mixed glue is influenced by particle size and the initial mixed glue viscosities. Too coarse a particle size results in separation of the extender. The exact particle size limits for this are difficult to ascertain due to the interference of the mixed glue viscosity effect, i.e. higher viscosity mixes show less extender separation tendency than do lower viscosity mixes with the same particle size. However, it can be stated that provided adequate viscosity is developed in the glue mixer say, 1200 cP or more) no extender separation occurs at particle sizes finer than 80% through 325 mesh. Coarse grinds, such as 60% through 325 mesh, show a definite separation independent of glue mix viscosity.

EXAMPLE VII

Effect of U.F. Resin Content of Glue Thickening in the Roll Spreader

A series of Western red cedar particleboard sander dust samples with different urea formaldehyde resin contents, were ground to the 90–95% 325 Mesh specification and tested for glue viscosity increase in the roll spreader. The viscosities after 45 minutes in the spreader are shown in FIG. 6, along with the standard Modal control result as a horizontal line at 11,000 cP, the acceptable maximum viscosity. The intersection of this line with the sander dust curves indicates the minimum acceptable urea formaldehyde resin content for satisfactory use of particleboard sander dust as a glue extender in glue to be applied by a roll spreader.

The roll spreading action imparts a large energy of mixing into the glue which causes the potential for excessive viscosity development in wood flour/particleboard sander dust materials. This excessive viscosity development has been impossible to duplicate by high speed mixing in a Waring blender or by continuous pumping, thus indicating that other methods of glue application, such as curtain coating or spraying, are not subject to the thickening problems of roll spreading. Thus, these other methods may be able to tolerate a lower urea formaldehyde content limit than that of roll spreading, something of the order of 10%.

Over the range 18 to 6% no significant effect of urea formaldehyde content on initial glue viscosity was observed. However, plain cedar wood flour with the same particle size but 0% urea formaldehyde gave a very high initial mixed glue viscosity which was immediately unusable on the roll spreader. Thus, in the range to 0 to 6%, urea formaldehyde content is critical for the development of satisfactory initial mixed glue viscosity, i.e. 0% is unsatisfactory and 6% is good and somewhere in between is the threshold value where mixing viscosity becomes too high.

EXAMPLE VIII

Effect of Wood Species on Suitability of Particleboard Sander Dust as a Plywood Glue Extender The results of FIG. 6 for red cedar wood species, a low density softwood, were compared to a similar test with Douglas fir Species, a high density softwood. The comparison of the two species results are shown in FIG. 7. The range of viscosities for the Douglas fir species was very similar to that with red cedar, and it is concluded that the performance of particleboard sander dust as a glue extender is independent of the wood species used with the same particle size and urea formaldehyde resin content.

There is an effect of wood species on the particleboard sander dust grinding output. Some species are easier to grind than others due to differences in toughness and density e.g. Douglas fir gives 20% less output than cedar at equal particle size, as shown in FIG. 8.

The urea formaldehyde resin content of the particleboard sander dust also effects the grinder output. A maximum output is reached at about 12% urea formaldehyde as shown in FIG. 8, with an output more than double that of plain wood with 0%.

During the fine grinding of the particleboard sander dust, there is loss of moisture content from the original board value of about 5% down to 2 or 3% depending on the grinder air flow and temperature conditions. This is a lower moisture content than the conventional extenders (e.g. Modal 6–10%, Norprofil 7–14%) and thus a saving in the shipping weight costs for equal dry weight of extender from a production facility. Over a period of time the particleboard sander dust material picks up some moisture from the air and returns to the original 5% moisture content. The time period depends on ambient conditions, but about a month during spring conditions on the coast of British Columbia, Canada, during which time the relative humidity is high, was observed to be required for this moisture content pickup.

We claim:

1. An adhesive composition comprising strongly adhesive aqueous alkaline phenol/formaldehyde resin and as an extender wood particles modified with about 6 to 18% by weight of the particles of cured urea/formaldehyde thermosetting resin, said modified wood particles being ground to where 75% or more of the modified wood particles are small enough to pass through a 325 mesh screen and with substantially no particles larger than about 150 microns.

2. The composition of claim 1 wherein the wood particles comprise sanderdust.

* * * * *